Sept. 5, 1933.  H. W. ZIMMERMAN  1,925,709
CYLINDER GRINDING TOOL
Filed July 12, 1930   4 Sheets-Sheet 2

Inventor:
Herman W. Zimmerman
Rector, Hibben, Davis & Macauley
Attorneys

Sept. 5, 1933. H. W. ZIMMERMAN 1,925,709
CYLINDER GRINDING TOOL
Filed July 12, 1930 4 Sheets-Sheet 4

Inventor:
Herman W. Zimmerman

Patented Sept. 5, 1933

1,925,709

UNITED STATES PATENT OFFICE 1,925,709

CYLINDER GRINDING TOOL

Herman W. Zimmerman, Chicago, Ill., assignor to Automotive Maintenance Machinery Co., Chicago, Ill., a corporation of Illinois Application July 12, 1930. Serial No. 467,475

23 Claims. (Cl. 51—184.3)

My invention relates to a tool which is arranged for the grinding of cylindrical bores, whether engine cylinders, rotary valve cavities, or of whatever nature, and is concerned more particularly with a tool of this character which is intended to operate at a high production rate, although effective under other working conditions also.

One object of the invention is to devise a tool in which the grinding head is susceptible of detachability from and attachability to the driving element with a minimum loss of operative time.

A further object is the provision in a tool of this character of mechanism for making position adjustments of the abrading stones, relative to the work, with a high degree of accuracy while the tool is in operation and in working position, the initial position of the stones being determined by the bore in question and the final position by the adjusting mechanism of the tool, thereby enabling successive bores to be ground to substantially the same diameter for any given adjustment of the tool.

A further object is to devise a tool of the character described in which the mechanism for transmitting the necessary movement for a change in position of the abrading stones is located relatively close to the latter, the control of the adjustment being remote from the stones thereby permitting an adjustment of the tool to be made while the head is in grinding position and further improving the accuracy of the tool through avoiding a false indication of the position of the stones by the control means arising from the "spring" of the parts under the grinding load.

A further object is to provide a grinding tool which is featured by a rugged and simple construction, both in the driving and adjusting mechanisms, the latter preferably enclosing the former, with a view of improving the strength and accuracy characteristics of the tool, and in which the several parts are particularly designed to reduce wear to a minimum to the end of lengthening the life of the unit.

Other objects include the provision of means whereby the ability of the tool to grind a bore to a true cylindricity is independent of any misalignment that may exist between the drive and the tool; which is characterized by an absence of play between the several parts through which grinding motion and adjustment is transmitted to the tool; which presents a substantially smooth exterior, eliminating all protruding, rotatable parts that would be dangerous to the operator; and which is highly accessible, easily adjusted and handled by the operator, whether skilled or unskilled.

The tool comprises generally a driving mechanism and an adjusting mechanism which are arranged for movement together for effecting the grinding operation and for relative movement when it becomes necessary to readjust the position of the stones in order to maintain contact with the surface of the work. For purpose of illustration, the invention will be described in connection with a rotary grinding tool in which the abrading stones are radially disposed and adjustable in radial directions, but it will be understood that the central thought disclosed herein is susceptible of embodiment in other types of grinding constructions.

These and further objects of my invention will be set forth in the following specification, reference being had to the accompanying drawings, and the novel means by which said objects are effectuated will be definitely pointed out in the claims.

Figures 2, 3:
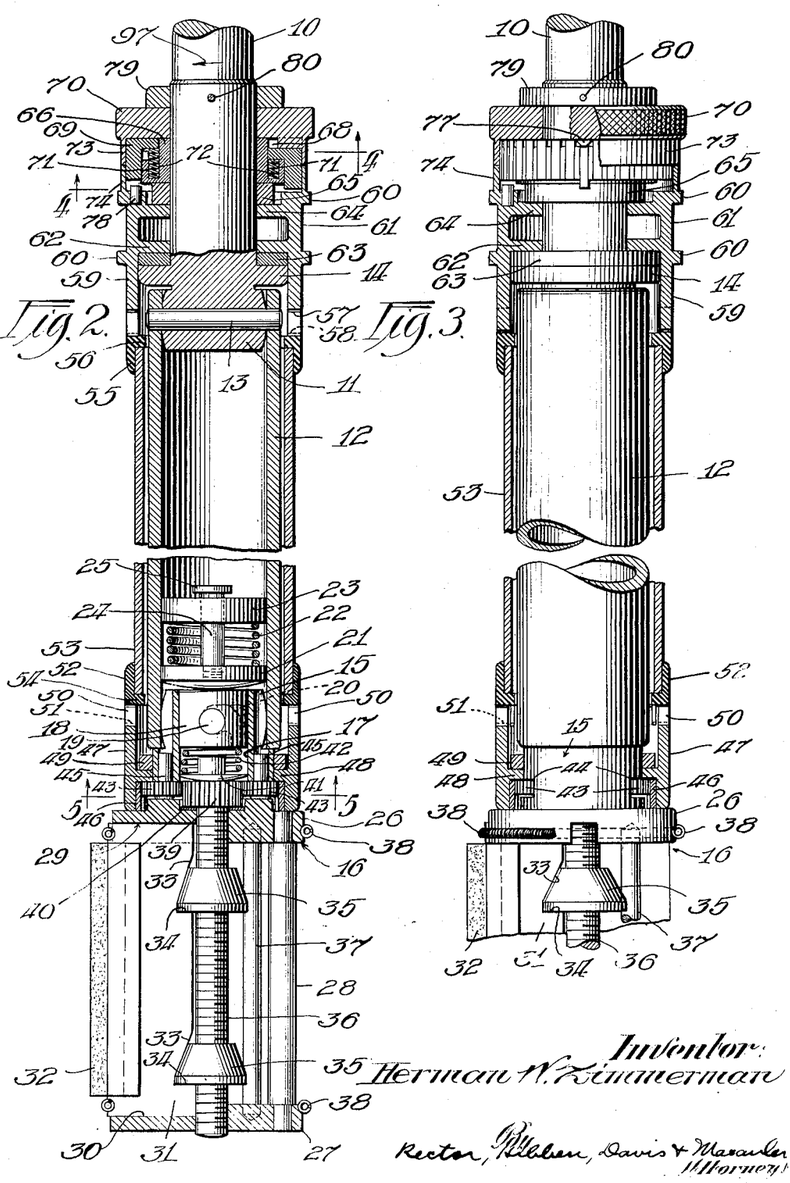
Fig. 2 is a section along the line 2—2 in Fig. 1, looking in the direction of the arrows.
Fig. 3 is a view generally similar to Fig. 2, certain parts being shown in elevation, and the index collar rotated from the position shown in Fig. 2 to illustrate its actuation of the radial stop blocks.

My improved grinding tool comprises a spindle 10 which may be fashioned at one end in any desired manner for engagement with a suitable driving member, not shown, and at the other, or lower end, as shown in Fig. 2, is shaped with a parti-spherical head 11 which is inserted within one end of a driving tube 12 and secured thereto by means of a pin 13. Immediately above the head 11, a circular flange 14 is formed on the spindle 10 for a purpose hereinafter explained, said flange being disposed a sufficient distance above the tube 12 to permit the spindle end to have a rocking motion relative thereto.

The opposite end of the tube 12 receives a reduced, parti-spherical portion 15 which is provided on a grinding head 16 and said portion is bored as at 17 to a predetermined diameter and depth downwardly from the upper end of the portion. The upper end of said bore is closed by a cylindrical plug 18, through which and said portion passes a pin 19 whose ends are received within a pair of bayonet slots 20 provided in the lower end of the tube 12 and which open downwardly at the end of said tube. The bayonet slots 20 are of approved design and include the usual vertical and horizontal portions, the closed end of the latter being so located that the pin 19 is normally disposed with reference to the pin 13, so that the connections of the spindle 10 and grinding head 16 with the driving tube 12 are in the nature of a universal joint, permitting relative axial movement of the indicated parts for a purpose hereinafter explained.

In order to insure retention of the pin 19 within the bayonet slot 20 and to prevent inadvertent disengagement therefrom, the upper end face of the plug 18, when the grinding head 16 is in position as shown in Fig. 2, engages with the parti-spherical under surface of a buffer head 21 which is slidably mounted within the tube 12 and normally pressed downward by means of a spring 22 which is interposed between said head and the under surface of a disk 23 which is secured within said tube. The buffer head 21 is guidably assisted in its sliding movement within the tube 12 by means of a stem 24 which is carried by said head and axially disposed with reference to said tube, said stem passing upwardly through the disk 23 and having formed on its upper end above said disk a collar 25 which limits the downward movement of the head 21.

Beyond the end of the tube 12, the portion 15 merges into the upper end plate 26 of the grinding head 16 and is spaced from the lower end plate 27 of said head by a plurality of rods 28 which are suitably located in said plates. The end plate 26 is provided with a plurality of outwardly-extending slots 29, preferably radially disposed with reference to the axis of the tube and facing downwardly, as shown in Fig. 2. Similarly, the lower end plate 27 is provided with a like arrangement of slots 30 which face upwardly and are arranged in complementary relation to the slots 29 to receive stone carriers 31 for slidable mounting therein. Each carrier 31 supports an abrading stone 32 which is arranged along its outer edge and its inner, longitudinal edge is provided with any desired number of faces 33 which incline outwardly from the axis of the head, being cut inwardly into the body of the carrier 31 and terminating in horizontal shoulders 34. The inclined faces 33 are engaged by the frusto-conical surfaces of spreader blocks 35 which are threaded on a stem 36 that is revolubly mounted in the end plates 26 and 27. Rotation of said blocks is prevented through slotted engagement with a guide bar 37 which is bridged between the end plates 26 and 27, as shown in Fig. 2. Accordingly, when the stem 36 is rotated as hereinafter described, the blocks 35 being prevented from rotating therewith, will have motion of translation only in an upward direction to thereby move the stone carriers 31 radially outwardly and when said blocks are returned to the position shown in Fig. 2, said carriers will be retracted by means of spring rings 38 which encircle the end plates 26 and 27 for engagement with such carriers.

The precise construction of the grinding head 16 forms no part of the present invention, and it will therefore be understood that the abrading stones 32 may be supported and the carrier 31 arranged in other manners than as indicated; also, that the carrier 31 may be moved outwardly according to other means than by the spreader blocks 35 and also retracted by other means than by the spring rings 38, but however the construction may be arranged, it is contemplated that the stem 36, considered generically as a rotative member, will be retained and the manner for effecting its rotation will now be described.

A gear 39 is secured to the upper end of the stem 36 and rides against a thrust washer 40 which encircles said stem for carriage on the plate 26. Endwise movement of the stem 36 in an upward direction, as viewed in Fig. 2, is prevented by the engagement of the buffer 41 with the upward surface of said stem, the buffer being pressed downwardly by means of a spring 42 which is interposed therebetween and the under surface of the plug 18.

The gear 39 meshes with a pair of pinions 43 which are diametrically located on opposite sides of said gear, the pinions 43 being disposed in a pair of slots 44 (see Fig. 5) which laterally extend from the bore 17 and the bearings for said pinions are achieved by means of stub-shafts 45 which rotate in suitable holes provided in the portion 15 of the grinding head 16. The outer peripheries of the pinions 43 mesh with an internal gear 46 which is disposed within the lower end of the sleeve 47. At its lower end, the sleeve 47 has contact with the upper surface of the end plate 26 and is maintained in this position by means of a ring 49 which is pressed tightly around the exterior of the portion 15 for engagement with an inwardly-extending, annular flange 48 provided on the sleeve 47 just above the pinions 43.

The upper end of the sleeve 47 is provided with a plurality of teeth 50, formed by cutting a plurality of slots around the upper circumferential edge of said sleeve, and said teeth mesh with similar teeth 51 provided around the lower edge of a band 52 which is pressed tightly on and around the lower end of an adjusting tube 53 which encloses the driving tube 12, adequate seating engagement between this band and the tube 53 being obtained by means of an inwardly-extending, annular flange 54 which is provided on said band and which contacts with the lower edge of the tube 53.

The upper end of the tube 53 has pressed tightly thereon a band 55 which has seating engagement therewith by means of an inwardly-extending, annular flange 56 which shoulders against the inner edge of said tube and said band is provided around its upper circumferential edge with a plurality of teeth 57 which mesh with similar teeth 58 disposed around the lower, circumferential edge of a brake sleeve 59. The sleeve 59 is provided with a pair of outwardly-extending, annular flanges 60 which are suitably spaced axially to provide an annular braking surface 61 for a purpose hereinafter explained. Said sleeve encircles the spindle 10 in the general locality of the head 11 and flange 14, preferably having a type of contact with the periphery of said flange such that, normally, the sleeve 59 will rotate with said spindle, but under an adequate retarding force applied to the braking surface 61, as hereinafter explained, will permit a relative rotation of said spindle and sleeve. As further assisting this requirement of operation, annular flanges 62 and 64, spaced axially from each other, extend inwardly from the sleeve 59 for contact with the periphery of the spindle 10, the flange 62 being spaced from the flange 14 by means of a collar 63.

Figure 4:
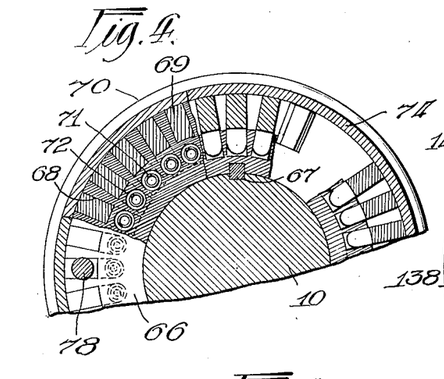
Fig. 4 is a section along the line 4—4 in Fig. 2, looking in the direction of the arrows, certain of the parts being shown displaced from the positions shown in Fig. 2.

Above the flange 64 and spaced therefrom by a ring 65, a cage 66 is secured to the spindle 10 by means of a key 67 (see Fig. 4). A plurality of radial slots 68 are formed in the cage 66 for the reception of stop blocks 69 which are of an inverted L-shape in section, the horizontal portion of the block being normally pressed upwardly, as viewed in Fig. 2, against the under surface of an index collar 70, which encircles the spindle 10, by means of individual springs 71 seated in individual pockets 72 provided on the cage. The vertical portions of the blocks 69 are arranged for movement only in the direction of their length and are prevented from moving outwardly by a depending sleeve 73 formed on the collar 70 which abuts against a similar sleeve 74 that extends upwardly from the brake sleeve 59. The index collar 70 may be provided with a zero mark, indicated by the numeral 75 in Fig. 1 and preferably located on the sleeve 73, and the sleeve 74 may be provided with any desired number of index marks, such as 76, there being preferably one index mark for each stop block 69 and the relation of the stop blocks with reference to each other is such that a rotation of the index collar 70 over an indicated number of the index marks 76, or in substance the same number of stop blocks 69, will effect a known adjustment of the abrading stones 32, expressed in fractions of an inch. For example, a movement of the zero marks 75 from one division 76 to the next division, may effect an outward, radial advance of the stones for a distance of approximately .001 inch. In order to actuate the stop blocks 69 individually, the under surface of the collar 70 is provided with a cam lug 77 which is located in alignment with the zero mark, designated by the numeral 75, on said collar. The brake drum sleeve 59 and the index collar 70 are maintained in the correct axial positions by a collar 79 which encircles the spindle 10 and is secured in place by a pin 80 which passes through said collar and spindle. A stop pin 78 is positioned in the upper, end surface of the sleeve 59, just within the retaining sleeve 74 for inter-action with the stop blocks 69 when depressed, as hereinafter described.

Figures 1, 11:
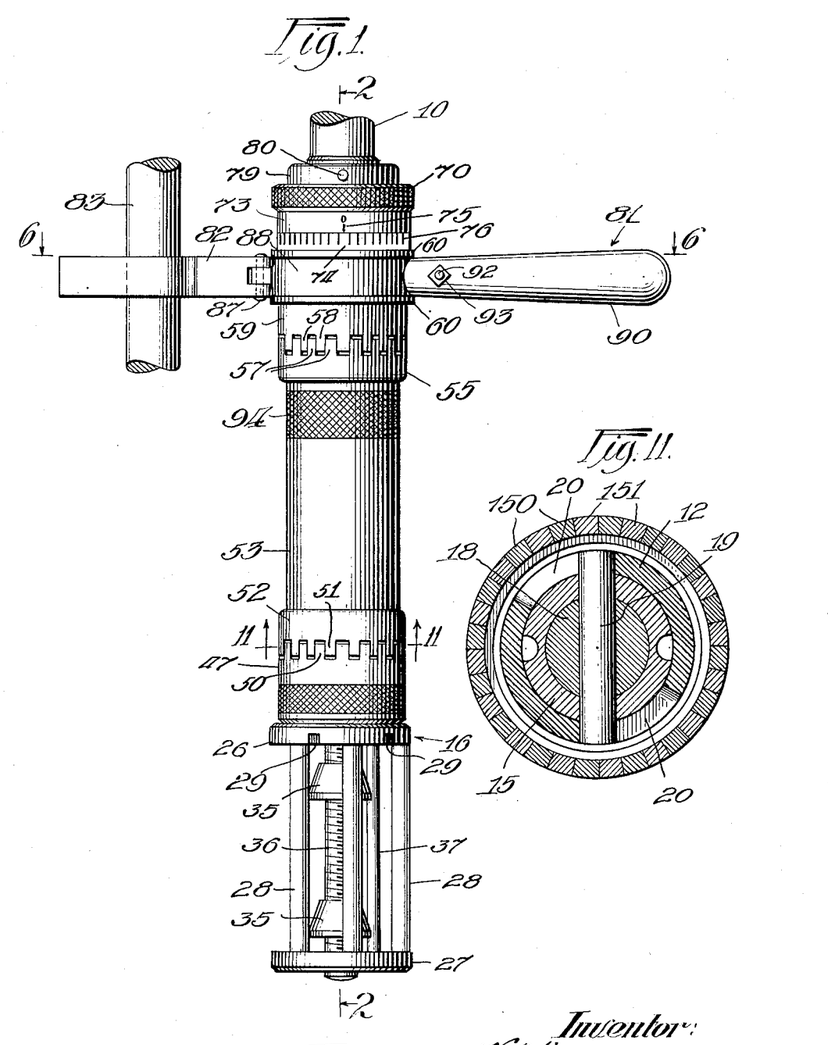
Figure 1 is an elevation of my improved cylinder grinding tool, certain parts including the abrading stones of the grinding head being omitted, and showing the brake which effects a relative movement of the driving and adjusting mechanisms.
Fig. 11 is a section along the line 11—11 in Fig. 1, looking in the direction of the arrows.
Figure 6:
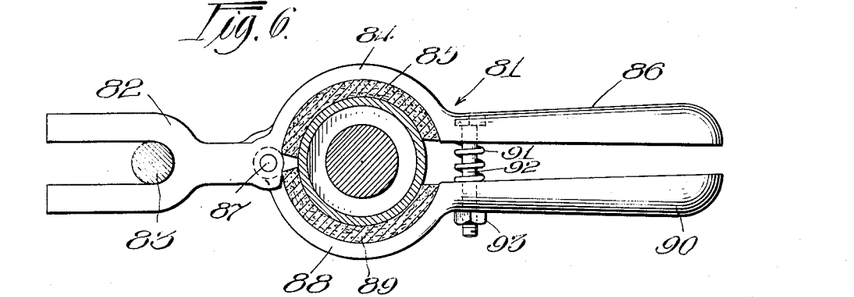

In order to effect a relative rotation of the brake sleeve 59 with respect to the spindle 10, a brake 81 is employed (see Figs. 1 and 6). This member comprises a yoke portion 82 which embraces a fixed rod 83, which is suitably carried in any desired location or by any machine, and on said yoke is formed a semi-circular brake arm 84 whose interior face is lined with brake material 85, and on said arm is provided a handle 86. A complementary, semi-circular brake arm 88 is pivoted as at 87 to the yoke 82 and is likewise provided around its interior face with brake material 89. The brake arm 88 is provided with a handle 90 and when the brake 81 is in position on the tool, that is with the brake arms 84 and 88 encircling the annular brake surface 61, the handles 86 and 90 will normally be extended away from each other by the spring 91 which is interposed between the opposing faces thereof, said spring encircling a bolt 92 which is seated at one end within the handle 86 and is slidably mounted at the other end through the handle 90 to receive on its outer end a nut 93. Accordingly, when the brake member 81 is in the position shown in Fig. 6, no braking effect will be exerted on the surface 61, due to the extension of the spring 91, and when the handles 86 and 90 are gripped to cause them to approach each other, the brake arms 84 and 88 will apply a degree of braking effort to the surface 61 dependent upon the extent of the gripping force applied to the handles 86 and 90.

From the detailed description noted above, it will be understood that the spindle 10 and the driving tube 12 comprise the driving mechanism for the grinding head 16, while the collar 70, brake drum sleeve 59, tube 53 and sleeve 47, together with the pinions 43, and gears 39 and 46, constitute the adjusting mechanism of the tool. It will also be understood that relative axial movement of the several elements comprising the driving mechanism are permitted by the universal joint connections indicated, and that this type of movement in the adjusting mechanism is also permitted through the medium of the meshing teeth 50 and 51, and 57 and 58, respectively.

Figure 5:
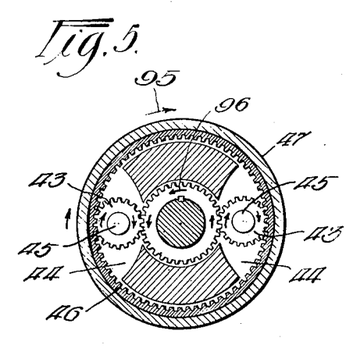
Figs. 5 and 6 are sections along the lines 5—5 and 6—6 in Figs. 2 and 1, respectively, looking in the direction of the arrows.

The operation of my improved grinding tool will now be described:

The grinding head 16 is inserted within the bore of the cylinder which is to be ground, and the abrading stones 32 are adjusted radially outward until the working faces thereof contact with the cylinder wall. In this position of the tool, considered as a whole, the adjusting tube 53 extends without the cylinder and may be provided with a knurled band 94 to facilitate rotation thereof by hand. The tube 53 is accordingly so rotated in the direction of the arrow 95, as shown in Fig. 5, the direction of rotation being viewed from the grinding end, whereby the gear 39 is rotated in the direction of the arrow 96, as also shown in Fig. 5, through the medium of the sleeve 47, internal gear 46, and the idler pinions 43. The direction of rotation of the gear 39 is such that, assuming the stem 36 to be provided with a right hand thread, the spreader blocks 35, which are fixed against rotation by the guide bar 37, will therefore move directly upward, as shown in Fig. 2, and interact with the inclined faces 33 to thereby advance the stones 32 in outward directions. This setting of the stones 32 constitutes the zero position of the tool for the bore in question and in order that this position may be suitably registered by the index collar 70, the latter will be rotated in the proper direction until it depresses a stop block 69 which is immediately adjacent to the stop pin 78 and in a lagging position to said pin considered with reference to the direction of rotation of the tool, which it will be assumed is indicated by the arrow 97, as shown in Fig. 2. The index collar 70 is then rotated opposite to the direction of the arrow 97 until the zero mark 75 thereof has passed over the required number of index marks 76 on the brake sleeve 59, the number of said marks being determined by the amount, expressed in fractions of an inch, through which it is desired to advance the abrading stone 32 outwardly. This final position of the collar 70 depresses one of the stop blocks 69 which is angularly disposed in the opposite direction of rotation from the stop pin 78 on the brake drum sleeve 59 and therefore affords a means of determining the extent of relative rotation of said sleeve and accordingly, the final, outward position of the abrading stones 32.

The stones 32 having been initially adjusted for the initial grinding of the cylinder wall and the tool having been adjusted to determine the final position of said stones, power will be applied to the spindle 10 to rotate the same in the direction of the arrow 97, the handles 86 and 90 of the brake 81 at this time occupying the relative positions shown in Fig. 6 with the brake therefore being inoperative. As the grinding of the cylinder wall proceeds, it becomes necessary to outwardly advance the abrading stones 32 in order to maintain the necessary working contact and this result is achieved by applying a braking force to the annular brake surface 61 through squeezing the handles 86 and 90 toward each other. Prior to the application of this braking force, it will be understood that the frictional contact between the several, touching elements of the driving and adjusting mechanisms insures the rotation of these mechanisms together. Upon the application of this force, however, which may be sufficient to actually stop the rotation of the sleeve 59 or merely to retard the same, said sleeve will have a relative rotation imparted thereto with reference to the driving mechanism which will be reflected in the rotation of the stem 36 through the interaction and operation of the several parts hereinbefore described in connection with a hand adjustment of the tool. The abrading stones 32 will therefore be successively advanced to new grinding positions until the stop pin 78 engages with the depressed stop block 69, whereupon further relative rotation of the sleeve 59 is prevented, it being remembered that said block is carried by the cage 66 which is keyed to the spindle 10, so that when said head reaches the indicated position, said block will drive the pin 78 and accordingly the remainder of the adjusting mechanism for synchronous rotation with the driving mechanism. To remove the tool from the cylinder bore, it is only necessary to rotate the tube 53 in a direction opposite to that indicated by the numeral 95 in Fig. 5, whereupon the spreader blocks 35 are moved downwardly, as shown in Fig. 2, and the stones 32 will be retracted inwardly by the spring rings 38.

One of the important features of the above described tool is the ability to rapidly attach new grinding heads to the remainder of the mechanism. As the stones 32 wear, it is contemplated that, instead of replacing individual stones on a grinding head which is secured to the tool, the entire head may be removed from the driving tube 12 quickly and easily by reason of the bayonet joint connection. This type of connection provides for the necessary driving engagement, but is also characterized by the highly important features of rapid detachability and attachability of the grinding head, a factor which is extremely advantageous in production work. The stones are capable of adjustment while the tool is in working position and even while in operation, the nature of the adjustment being such as to obtain a high degree of dependable accuracy. Moreover, the manner of the adjustment is such that successive cylinders may be ground to substantially the same diameter without the necessity of making repeated adjustment settings for successive cylinders. In addition, the ability of the tool to grind a bore which is truly coaxial with the remainder of the cylinder is not affected by any misalignment which may exist between the drive and the grinding head, the universal joint connection between the spindle 10 and the grinding head 16 providing for this character of operation.

Moreover, the driving mechanism has been arranged to secure a transmission of power through strong and durable parts, with the object of minimizing chattering during the working of the tool. With reference to the adjusting mechanism, it will be noted that it is arranged for enclosure of the driving mechanism through substantially its whole length, resulting in a more rugged construction for this portion of the tool and consequent greater accuracy. The latter feature is further enhanced by the location of the power transmission for the adjusting mechanism, comprised in the gears 39 and 46, and the pinions 43, which are disposed relatively close to the grinding head, thereby stiffening this portion of the tool and preventing the creation of any "spring" in the parts between the transmission and the grinding head, which would otherwise cause variations in the adjustment and a false indication by the index collar 70.

Figures 7, 8:
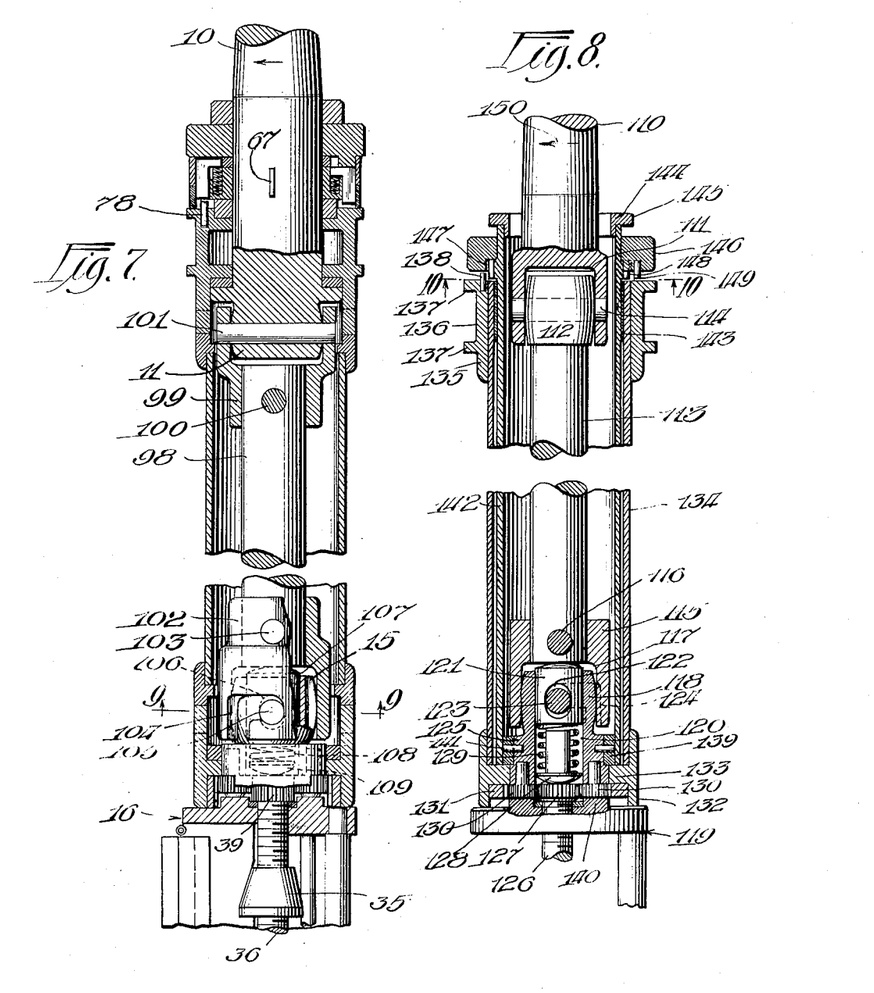
Figs. 7 and 8 are sectional views corresponding generally to Fig. 2 and showing modifications of the tool shown in the latter figure.
Figure 9:
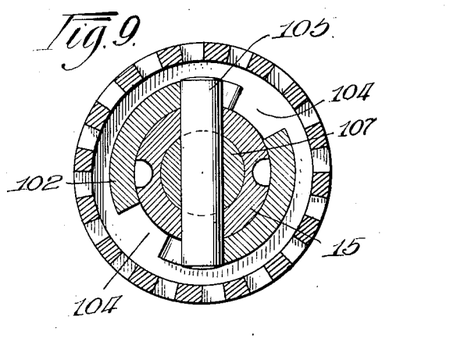
Figs. 9 and 10 are sections along the lines 9—9 and 10—10 in Figs. 7 and 8, respectively, looking in the direction of the arrows.
Figure 10:
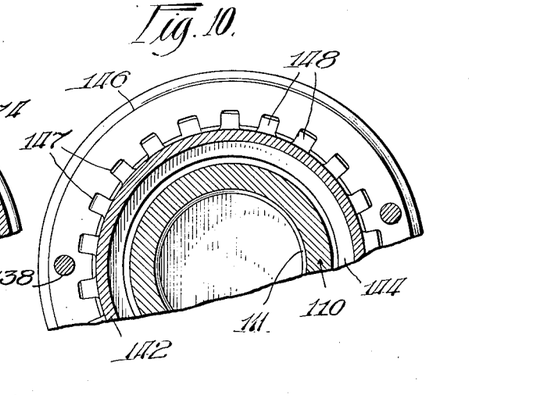

The modification illustrated in Fig. 7 is substantially identical with that shown in Fig. 2 with the exception that a solid shaft 98 is substituted for the tube 12 as a means of transmitting the drive from the spindle 10 to the grinding head 16. The upper end of the shaft 98 is secured to the lower end of the spindle 10 by means of a coupling 99 which is attached to said shaft by means of a pin 100 and which is bored to embrace the parti-spherical head 11 on said spindle, the latter parts being united by a pin 101. The lower end of the shaft 98 has mounted thereon a coupling 102, secured thereto by the pin 103 and the projecting portion of the coupling 102 is bored to receive the parti-spherical, reduced portion 15 of the head 16. The coupling 102 is further provided with a pair of oppositely disposed, bayonet slots 104 which receive the ends of the pin 105 mounted in the portion 15.

The pin 105 passes through an elongated slot 106 provided in a plug 107 which closes the upper end of the axial hole in the portion 15, corresponding therefore to the similar plug 18 shown in the preferred form of the tool in Fig. 2. The plug 107 is slidable within the portion 15 and is prevented from disengagement therefrom by the limit set by the ends of the slot 106 and the pin 105. When in the position shown in Fig. 7, the plug 107 is forced upwardly for contact with the lower end of the shaft 98 by means of a spring 108 disposed there below, said spring contacting at the opposite end thereof with a buffer disk 109 which engages with the upper surface of the gear 39, thereby preventing endwise movement of the stem 36. Excepting for these modifications, the structure shown in Fig. 7 is identical with that shown in Fig. 2 and operates precisely in the same manner.

The modification illustrated in Fig. 8 embodies certain features of construction which are entirely distinct from the other two forms heretofore described, in that, generically speaking, no provision is made in a mechanical sense for any universal movement of the adjusting mechanism, but the same result substantially is attained through providing for a relative floating movement of both mechanisms during the operation of the tool, in the event that any misalignment occurs between the grinding head and the drive.

The numeral 110 designates the driving spindle which, at the upper end may be suitably fashioned for driving engagement with any desired type of driving member and at the lower end is slightly enlarged and bored as at 111 to receive the parti-spherical, upper head portion 112 of a drive shaft 113, a pin 114 passing through the indicated parts to secure said spindle and shaft together. At the lower end of the shaft 113, a coupling 115 is secured thereto by a pin 116 and said coupling extends below said shaft to receive within a bored recess 117 thereof, a parti-spherical, reduced head portion 118 which is provided on a grinding head 119. The portion 118 is axially bored as at 120 and the upper end thereof is closed by a cylindrical plug 121 which is slidable within said bore 120 and is provided with an elongated slot 122 through which a pin 123 passes, said pin being seated within the portion 118 and extending there beyond to be received within a pair of bayonet slots 124 formed in the coupling 115. The lower end of the coupling 115 is disposed sufficiently above a laterally extending shoulder 125 formed on the head 118 to permit a relative pivotal action between the coupling 115 and said head, the location of the pin 123 being further arranged in a plane which is normal to the pin 114, the pivotal connections at the opposite ends of the shaft 113 therefor being complementary to each other and constituting a universal joint.

The grinding head 119 is identical with that shown in Fig. 2 and a detailed description thereof is therefore unnecessary. The threaded stem 126, corresponding to the similar stem 36 shown in Fig. 2, is axially mounted in the head 119 and at the upper end thereof has secured thereto a gear 127, which is therefore coaxial with the bore 120. Endwise movement of the stem 126 in an upward direction, as viewed in Fig. 8, is prevented by a buffer 128, located within the bore 120, which is pressed downwardly by a spring 129 interposed therebetween and the underside of the plug 121 which seats against the lower end of the shaft 113. The gear 127 meshes with a pair of pinions 130 diametrically located in opposite sides thereof, and said pinions on their outer peripheries mesh with an internal gear 131 which is seated within a band 132 against a shoulder defined by an inwardly-extending, annular flange 133 which abuts against the lower end of the portion 118. The lower end of the band 132 rests on the upper end of the grinding head 119 and the upper end of said band is pressed tightly on and around the lower end of an adjusting sleeve 134. The upper end of said sleeve carries a brake drum 135 having an annular braking surface 136 which is defined by a pair of spaced, annular flanges 137. The drum 135 also carries a stop pin 138 for a purpose hereinafter explained, which pin extends upwardly from the upper surface of said drum.

Immediately above the flange 133, a band 139 encircles the projection 125 on the head 119 below the reduced portion 118 and is secured to said projection by pins 141. The lower end of an index tube 142 is squeezed tightly on said band, being located within the brake sleeve 134 and enclosing the drive shaft 113, the interior diameter of said tube being ample to provide the necessary clearance and also to permit the upward withdrawal of the shaft 113 with its accompanying couplings members in the manner hereinafter described. The upper end of said tube has driving engagement with the brake sleeve 134 by means of a bearing sleeve 143 and said tube extends upwardly beyond the brake drum 135 and has secured on the end thereof a collar 144, whose internal diameter is sufficient to permit the passage therethrough of the coupling 115 and is also provided with an outwardly extending, annular flange 145 for a purpose hereinafter explained. An index collar 146 is slidably mounted on the tube 142 immediately below the collar 145 and is internally formed with a plurality of radially disposed serrations or teeth 147 which mesh with correspondingly formed serrations or teeth 148 arranged around the tube 142. The length of the teeth 148 and the relation of the teeth 147 thereto is such that said teeth mesh only when the collar 146 is in the position shown in Fig. 8 and when said collar is moved upwardly to contact with the flange 145, said teeth will be free of engagement to permit a free rotation of the collar 148 on the tube 142 for a purpose hereinafter explained. The collar 146 also carries a pin 149 which is arranged for engagement with the stop pin 138 as hereinafter described.

In operating the modification shown in Fig. 8, the tool is placed in position with the grinding head 119 within the cylinder bore as described above and the abrading stones of said head are then outwardly adjusted to place them in working contact with the wall of the cylinder by suitably rotating the brake sleeve 134 by hand, the necessary adjustment being effected through the gears 127 and 131, and the pinions 130 in a manner similar to that described above. This setting constitutes the zero position of the stones and in order to secure a suitable registration of this position on the adjusting mechanism of the tool, the index collar 146 is moved upwardly to free the teeth 147 and 148 from engagement and is then turned until the pin 149 is placed in contact with the pin 138 and in lagging relation thereto, considered with respect to the direction of rotation. The collar 146 having been so placed in its zero position, it will again be raised to free the teeth 147 and 148 and then turned opposite to the direction of rotation of the tool, as indicated by the arrow 150, to secure the necessary angular advance of the pin 138 with respect to the pin 149, this advance being expressed in fractions of an inch, preferably, and suitably indicated on the surface of the tool by appropriate marking.

Thereafter, the operation of the tool is generally similar to the form shown in Fig. 2, that is, when it becomes necessary to further advance the abrading stones outwardly, a retarding force will be applied to the brake surface 136 by the brake 81 to effect the necessary readjustment. Successive retardations and readjustments will eventually bring the pin 138 into contact with the pin 149, whereupon further relative rotation of the sleeve 134 with reference to the driving mechanism, or with reference to the tube 142, is prevented, since said tube is directly secured to the driving mechanism by means of the pins 141. The tool may then be removed from the completed bore after first turning the brake sleeve 134 in the required direction.

In this modification, misalignment between the drive and the grinding head is compensated for by the ability of the driving mechanism to move freely within the tube 142, it therefore being unnecessary to provide for any conforming movements on the part of the sleeve 134 and the tube 142. Accordingly, these parts may be constructed rigidly. Disengagement of the grinding head from the drive shaft 113 is accomplished at the bayonet joint connection of these parts, whereupon the head, the tube and sleeve carried thereby may be moved directly downward, while the drive shaft 113 pulls upwardly.

While I have shown one set of elements and combinations thereof for effectuating my improved cylinder grinding tool, it will be understood that the same is intended for purposes of illustration only and in no wise to restrict my device to the exact forms and structures shown, for many changes may be made therein without departing from the spirit of my invention.

I claim:

1. In a cylinder grinding tool, the combination of a grinding head having stones adjustable relative to the surface being ground, of means in said head for adjusting said stones, driving mechanism including a drive member located remote from said head for imparting a grinding movement to said head, and adjusting mechanism completely enclosing said driving mechanism and operable to change the positions of said stones relative to said surface, said adjusting mechanism comprising an adjusting member located adjacent said drive member and an angularly adjustable connection leading from said adjusting member to said head-carried adjustment means.

2. In a cylinder grinding tool, the combination with a grinding head having stones adjustable relative to the surface being ground, of means in said head for adjusting said stones, driving mechanism including a drive member located remote from said head for imparting a rotary grinding movement to said head, and adjusting mechanism completely enclosing said driving mechanism and operable to change the positions of said stones relative to said surface, said adjusting mechanism comprising a member located adjacent said drive member, another member connected to said stone adjusting means, and a third member connected to said first and second-mentioned members by means permitting angular adjustment therebetween.

3. In a cylinder grinding tool, the combination with a grinding head having stones adjustable relative to the surface being ground, of a drive member, an angularly adjustable driving connection between said head and drive member for imparting a rotary grinding movement to said head, and adjusting mechanism adjustable angularly relative to said drive member and head and completely enclosing said drive connection and operatively connected to said stones, said mechanisms being rotatable together during the grinding operation and arranged for selective relative rotation during the grinding operation to change the positions of said stones with respect to said surface.

4. In a cylinder grinding tool, the combination with a grinding head insertable within a cylinder and having stones adjustable relative to the wall thereof, of a drive member, a driving mechanism having a pivotal joint connection with said head and also connected to said drive member by a pivotal joint connection for imparting a rotary grinding movement to said head aligned with the axis of said cylinder, irrespective of axial disalignment of said head and mechanism, and adjusting mechanism having pivotal joint connections therein adjacent the pivotal joints in the driving mechanism and completely enclosing said driving mechanism for changing the positions of said stones relative to said wall.

5. In a cylinder grinding tool, the combination of a grinding head having stones adjustable relative to the surface being ground, a driving member connected at one end to said head and adapted for operation by a driver at the opposite end, tubular means enclosing said member for normal rotation therewith and arranged for rotation relative thereto, means at the end of said tubular means adjacent said driver for effecting a rotation of said tubular means relative to said member during the grinding operation, and transmitting means connecting the other end of said tubular means with said stones and operable upon the relative rotation of said member and tubular means to move said stones to desired positions.

6. In a cylinder grinding tool, the combination of a grinding head having stones adjustable relative to the surface being ground, a driving member connected at one end to said head and adapted for operation by a driver at the opposite end, tubular means having a stop pin enclosing said member for normal rotation therewith and arranged for rotation relative thereto, transmitting means connecting said tubular means with said stones and operable upon the relative rotation of said member and tubular means to move said stones to the desired positions, and a plurality of stop blocks carried by said driving member and individually movable for engagement with said pin to limit the final grinding positions of said stones by determining the extent of relative rotation of said tubular means.

7. In a cylinder grinding tool, the combination of a grinding head having stones adjustable relative to the surface being ground, a driving member connected at one end to said head and adapted for operation by a driver at the opposite end, tubular means enclosing said member for normal rotation therewith and arranged for rotation relative thereto, transmitting means connecting said tubular means with said stones and operable upon the relative rotation of said member and tubular means to move said stones to desired positions, a plurality of radially disposed, movable stop blocks carried by said driving member, and a collar encircling said member having a cam portion for individually moving said blocks for engagement with said pin, thereby determining the extent of relative rotation of said tubular means and the final grinding positions of said stones.

8. In a cylinder grinding tool, the combination of a grinding head having stones adjustable relative to the surface being ground, a tubular member connected at one end by a bayonet joint to said head and adapted for operation by a driver at the opposite end, tubular means completely enclosing said member and bayonet joint and operable to change the positions of said stones relative to said surface, and yieldable abutment means concealed by said driving member and acting upon said bayonet joint to prevent accidental detachment of the latter.

9. In a cylinder grinding tool, the combination of a grinding head having stones adjustable relative to the surface being ground, a tubular driving member connected at one end by a bayonet joint to said head and adapted for operation by a driver at the opposite end, tubular means enclosing said member and operable to change the positions of said stones relative to said surface, and normally inaccessible means located wholly within said member for preventing inadvertent disengagement of the bayonet joint.

10. In a cylinder grinding tool, the combination of a tubular driving member having a bayonet joint element at one end and adapted for operation by a driver at the opposite end, a spring-actuated buffer located within said member adjacent said end, a grinding head having a portion provided with a complementary bayonet joint element insertable within said member for connection therewith and engagement with said buffer, said head having stones adjustable relative to the surface being ground, and tubular means enclosing said member and operable to change the positions of said stones.

11. In a cylinder grinding tool, the combination of a grinding head having a projecting sleeve and stones adjustable by said sleeve insertable within a cylinder, a driving member having a pivotal connection at one end with said head and a pivotal connection at the opposite end with the driver, said pivotal connection constituting a universal joint, tubular means enclosing said member and pivotal connections, and having driving connection with said sleeve, the rotary movement and adjustment of said head in alignment with the axis of said cylinder being thereby maintained irrespective of the misalignment of said head and driving member.

12. In a cylinder grinding tool, the combination of a grinding head having a projecting sleeve and stones adjustable by said sleeve insertable within a cylinder, a tubular driving member having a detachable, pivotal connection at one end with said head and a pivotal connection at the opposite end with a driver, said pivotal connection constituting a universal joint, tubular means enclosing said member and pivotal connections and having driving connection with said sleeve, the rotary movement and adjustment of said head in alignment with the axis of said cylinder being thereby maintained irrespective of the misalignment of said head and driving member.

13. In a cylinder grinding tool, the combination of a driving member, a grinding head connectible to said member and having movable abrading stones, a stem in said head having spreader means for moving said stones, means for preventing endwise movement of said stem, a gear secured to the end of said stem for rotating the same, tubular means having an internal gear enclosing said member, said means rotating synchronously with said member during the grinding operation and retardable for rotation relative to said member, pinions engaging with said stem and internal gears to effect a rotation of said stem during said retardation, said driving member extending through said tubular means and concealed thereby.

14. In a cylinder grinding tool, the combination of a driving member, a grinding head connectible to said member and having movable abrading stones, a stem in said head having spreader means for moving said stones, a spring-actuated buffer disposed within the upper portion of said head and engageable with said stem for preventing endwise movement thereof, a gear secured to the end of said stem for rotating the same, tubular means having an internal gear enclosing said member, said means rotating synchronously with said member during the grinding operation and retardable for rotation relative thereto, and pinions engaging with said stem and internal gears to effect a rotation of said stem during said retardation.

15. In a cylinder grinding tool, the combination of a driving member, a grinding head connectible to said member and having movable abrading stones, a stem in said head having spreader means for moving said stones, a gear secured to the end of said stem for rotating the same, tubular means enclosing said member having an internal gear at one end adjacent said stem gear and a stop pin at the opposite end thereof, said means rotating synchronously with said member during the grinding operation and retardable for rotation relative thereto, pinions engaging with said stem and internal gears to effect a rotation of said stem during said retardation, and a plurality of stop blocks carried by said driving member and individually movable for engagement with said pin to limit the final grinding positions of said stones by determining the extent of relative rotation of said tubular means.

16. In a cylinder grinding tool, the combination of a driving member, a grinding head connectible to said member and having movable abrading stones, a stem in said head having spreader means for moving said stones, a gear secured to the end of said stem for rotating the same, tubular means enclosing said member having an internal gear at one end adjacent said stem gear and a stop pin at the opposite end thereof, said means rotating synchronously with said member during the grinding operation and retardable for rotation relative to said member, pinions engaging with said stem and internal gears to effect a rotation of said stem during said retardation, a plurality of radially disposed, movable stop blocks carried by said driving member, and a collar encircling said member having a cam portion for individually moving said blocks to engage with said pin, thereby determining the extent of relative rotation of said tubular means and limiting the final grinding positions of said stones.

17. In a cylinder grinding tool, the combination of a grinding head having a projecting sleeve provided with teeth and stones adjustable by said sleeve insertable within a cylinder, a driving member having a pivotal connection at one end with said head and a pivotal connection at the opposite end with a driver, said pivotal connection constituting a universal joint, a second sleeve having teeth encircling said member adjacent the pivotal connection remote from said head, tubular means enclosing said member and having teeth at each end engageable with the teeth of said sleeves, the rotary movement and adjustment of said head in alignment with the axis of said cylinder being thereby maintained irrespective of the misalignment of said head and driving member.

18. In a cylinder grinding tool, the combination of a grinding head having a projecting sleeve provided with teeth and stones adjustable by said sleeve insertable within a cylinder, a driving member having a pivotal connection at one end with said head and a pivotal connection at the opposite end with a driver, said pivotal connection constituting a universal joint, a brake drum having teeth encircling said member adjacent the pivotal connection remote from said head, tubular means enclosing said member and having teeth at the ends engageable with the teeth of said sleeve and drum, said driving member, tubular means, sleeve and drum rotating together during the grinding operation and said means, sleeve and drum being arranged for rotation as a unit relative to said member, and a brake applicable to said drum for retarding the same to effect the adjustment of said stones, the rotary movement and adjustment of said head in alignment with the axis of said cylinder being thereby maintained irrespective of the misalignment of said head and driving member.

19. In a cylinder grinding tool, the combination of a grinding head having stones adjustable relative to the surface being ground, a driving member connected at one end by a pivotal connection to said head and adapted for connection by a pivotal connection to a driver at the opposite end, tubular means completely enclosing said member and connections for normal rotation therewith and arranged for rotation relative thereto, transmitting means connecting said stones with the end of said tubular means adjacent said grinding head and operable upon the relative rotation of said member and tubular means to move said stones to desired positions, and control means for limiting the final grinding positions of said stones.

20. In a cylinder grinding tool, the combination of a grinding head having stones adjustable relative to the surface being ground, a driving member connected at one end to said head and adapted for operation by a driver at the opposite end, tubular means enclosing said member for normal rotation therewith and arranged for rotation relative thereto, transmitting means connecting said stones with the end of said tubular means adjacent said grinding head and operable upon the relative rotation of said member and tubular means to move said stones to desired positions, and control means positioned adjacent the opposite end of said tubular means for limiting the final grinding positions of said stones.

21. In a cylinder grinding tool, the combination of a grinding head having stones adjustable relative to the surface being ground, a driving member connected at one end to said head and adapted for operation by a driver at the opposite end, tubular means enclosing said member for normal rotation therewith and arranged for rotation relative thereto, transmitting means connecting said stones with the end of said tubular means adjacent said grinding head and operable upon the relative rotation of said member and tubular means to move said stones to desired positions, and control means carried by said driving member adjacent the opposite end of said tubular means and engageable with said tubular means for limiting the final grinding positions of said stones by determining the extent of relative rotation of said tubular means.

22. In a cylinder grinding tool, the combination of a grinding head, a tubular driving member connected at one end to said head by a bayonet joint and adapted for operation by a driver at the opposite end, and yieldable stop means located within and wholly concealed and rendered normally inaccessible by said member for preventing unintended disengagement of said joint.

23. In a cylinder grinding tool, the combination of a grinding head, a tubular driving member connected at one end to said head by a bayonet joint and adapted for operation by a driver at the opposite end, and a spring actuated buffer located within said member and engageable with said head for preventing inadvertent breaking of said joint.

HERMAN W. ZIMMERMAN.